United States Patent
Aoki

(10) Patent No.: US 7,729,383 B2
(45) Date of Patent: Jun. 1, 2010

(54) MULTIPLEXER AND MULTIPLEXING METHOD

(75) Inventor: Yoshikazu Aoki, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 423 days.

(21) Appl. No.: 11/783,326

(22) Filed: Apr. 9, 2007

(65) Prior Publication Data
US 2007/0237187 A1    Oct. 11, 2007

(30) Foreign Application Priority Data
Apr. 10, 2006    (JP) ............................. 2006-107525

(51) Int. Cl.
*H04J 3/24* (2006.01)
(52) U.S. Cl. .................. 370/474; 709/231; 386/69; 386/95
(58) Field of Classification Search ............... 370/474; 709/231; 386/69, 95
See application file for complete search history.

(56) References Cited

U.S. PATENT DOCUMENTS

2001/0055318 A1*  12/2001  Obata et al. ............. 370/474
2002/0129155 A1*  9/2002  Kovacevic ................ 709/231
2005/0036763 A1*  2/2005  Kato et al. ................ 386/69
2006/0188223 A1*  8/2006  Ikeda et al. .............. 386/95

FOREIGN PATENT DOCUMENTS

JP    9-284732    10/1997
JP    11-341054    12/1999

* cited by examiner

*Primary Examiner*—William Trost, IV
*Assistant Examiner*—Kyle C Kasparek
(74) *Attorney, Agent, or Firm*—Foley & Lardner LLP

(57) ABSTRACT

A multiplexer according to an embodiment of the present invention multiplexes a video ES and an audio ES to generate a transport stream TS, and includes a video buffer, an audio buffer, and a multiplexing unit. A multiplexing unit executes simulation of a buffer occupation necessary for a video ES upon decoding the TS, and controls multiplexing of the video ES not to cause overflow of a buffer based on the simulation result. In the simulation, a predetermined time Δt is divided by N ((main buffer leak rate/system clock frequency)×N (N is an integer)=integer), the remainder R is carried over to the next calculation, and a current main buffer leak data amount is calculated by integer arithmetic based on the integral quotient.

13 Claims, 9 Drawing Sheets

MULTIPLEXER AND MULTIPLEXING METHOD

BACKGROUND OF THE INVENTION

1. Field of the Invention

The present invention relates to a multiplexer and a multiplexing method, which are suitable for generating a transport stream used for multiplexing and transferring a video or audio elementary stream.

2. Description of Related Art

FIG. 1 shows the structures of an ES (Elementary Stream), a PES (Packetized Elementary Stream), and a TS (Transport Stream) As shown in FIG. 1, under MPEG (Moving Picture Expert Group) transmission standards, video elementary data (ES) including encoded image data are packetized into an appropriate size to thereby generate a packetized ES (PES).

FIG. 2 shows the data structure of a PES packet header. As shown in FIG. 2, a PES packet is added with header information called a PES header. The PES header includes a start code prefix that stores a start code, a stream ID (stream_id) that stores a code for identifying each stream, a PES packet length that stores a packet length of the PES packet, and optional field data. In the optional field, the other optional field as well as a PES priority that indicates a priority given to a packet and a stuffing byte for adjusting a packet length is set. In the optional field, 90 kHz-based decoding time and presentation time called a DTS (Decoding Time Stamp) and a PTS (Presentation Time Stamp) are written. The decoding time DTS and Presentation time PTS are time information for synchronous reproduction.

As a MPEG2 system format, there are two system types: a transport stream TS and a program stream PS (Program Stream). The PES is a basic element for the two streams and is in an intermediate state to enable mutual conversion. Regarding a transport stream, as shown in FIG. 1, a PES is divided into a packet having a fixed length of 188 bytes, which is called "transport packet (TS packet) The transport packet is multiplexed with audio data, stream data, or the like into a transport stream. Then, the transport stream is output. The TS packet is composed of a packet header having a fixed length of 4 bytes, an adaptation field having a variable length, and a payload. The packet header (TS header) defines a PID (packet identifier) or various flags. A TS packet type is identified based on the PID.

The transport stream TS is generated by supplying a video ES and an audio ES to a multiplexer, and packetizing and multiplexing the ESs with the multiplexer. The multiplexer should multiplex a transport stream without causing overflow or underflow of an audio buffer and video buffer at a decoder. For example, a data packet transmitting device as disclosed in Japanese Unexamined Patent Application Publication No. 11-341054 (Takasaka) includes a flow controller that divides contents data into TS packets in accordance with each system format and outputs the TS packets and a packetizer that multiplexes the TS packet into a multiplexed TS packet at a predetermined transport bit rate to supply the packet to a multiplexer. The multiplexer multiplexes and outputs the multiplexed TS packet as well as a video TS packet and an audio TS packet. Here, the flow controller can appropriately insert a null packet based on a ratio between the entire output bit rate and a bit rate of individual TS packets to thereby send TS packets at a predetermined bit rate.

Incidentally, the multiplexer is set to perform virtual buffer simulation with a virtual decoder (transport stream system target decoder (T-STD)) based on the MPEG standards (ISO/IEC13818-1) as described below to generate a transport stream conforming to the MPEG transmission standards.

FIG. 3 is a block diagram of a transport stream system target decoder T-STD. The T-STD is a conceptual model for modeling decoding processing executed with a multiplexer upon generating and verifying a transport stream.

Reference numeral 302 denotes a demultiplexer; 311, a video transport buffer [TBvid]; 321, an audio transport buffer [TBaud]; 331, a system transport buffer [TBsys]; 312, a video main buffer [MB]; 313, a video elementary buffer [EB]; 322, an audio main buffer [Baud]; 332, a system main buffer [Bsys]; 314, a video decoder [Dvid]; 323, an audio decoder [Daud]; and 333, a system decoder [Dsys].

The input transport stream TS (301) is divided into video, audio, or system TS packets with the demultiplexer 302, and the packets are input to the video transport buffer 311, the audio transport buffer 321, and the system transport buffer 331. A TS header is removed from the video TS packet input to the video transport buffer 311, and the packet is transferred to the video main buffer 312 at a leak rate (Rxvid) 341. The leak rate 341 is an amount of data to be retrieved from the video transport buffer per unit time.

The packetized video ES data (video PES data) stored in the video main buffer 312 is transferred to the video elementary buffer 313 at the leak rate (Rbx) 342 if there is a free space in the video elementary buffer 313. In the case of transferring the video PES data from the video main buffer 312 to the video elementary buffer 313, all PES headers just preceding the video PES data in the video main buffer 312 are instantly removed. As for video elementary data stored in the video elementary buffer 313, data corresponding to 1 frame are removed from the video elementary buffer 313 instantly at the decoding time (DTS), and the obtained data is decoded with the video decoder 314.

As for the audio data, data are removed from the audio main buffer 322 similar to video data, and the obtained data is decoded with the audio decoder 323. Further, as for the system data, data are removed from the system main buffer 332 at a standardized rate, and the obtained data is decoded with the system decoder 333.

The multiplexer performs T-STD buffer simulation with a transport stream system target decoder under the MPEG transmission standards. This simulation is referred to as "T-STD virtual buffer simulation. The multiplexer selectively outputs video, audio, and system TS packets based on the simulation result to thereby generate a transport stream conforming to the ISO/IEC13818-1 standards. The buffer simulation is generally performed in units of 90 kHz similar to the decoding time DTS and the Presentation time PTS or 27 MHz corresponding to a MPEG2 system clock.

Incidentally, the MPEG-2 system are compatible with various moving picture compressing functions or various image sizes, so these should be classified based on the level and profile to definitely distinguish these from one another and avoid any confusion resulting from mutual transmission. The profile defines space, time, and whether or not there is an SNR scalability, which corresponds to a resolution, a frame rate, and a function of concurrently processing plural images of different image qualities. The level defines a resolution and a frame rate (the number of frames per second).

As an example of the specifications that a desired MPEG2 function can be used in accordance with the application, there is a Main profile Main level (Main Profile@Main Level: MP@ML). It is possible with the MP@ML to process images of 720×480 pixels and 30 frames/sec like current television images and to use a bidirectional predictive system that adopts both of previous and subsequent images of an image that is being compressed, as a target for movement detection. The MP@ML defines a video buffer size or leak rate in a transport stream system target decoder (T-STD) as follows.

TB size=512 (byte)
MB size=10,000 (byte)
EB size=229376 (byte)
Leak rate Rxvid from video transport buffer TBvid to main buffer MB=18,000,000 (bps)
Leak rate Rbx from main buffer MB to elementary buffer EM=15,000,000 (bps)

However, as described later, the leak rate Rbx from the main buffer MB (312) to the elementary buffer EM (313) is divisible by neither 90 kHz nor 27 MHz.

$$15,000,000 (bit/s) = 1,875,000 \text{ (byte/s)}$$

$$1,875,000 \div 90,000 = 20.833\ldots \text{ (byte: 90 kHz)}$$

$$1,875,000 \div 27,000,000 = 0.06944\ldots \text{ (byte: 27 MHz)}$$

Hence, an amount of leak from the main buffer 312 to the elementary buffer 313 is calculated from $20.833\ldots \times s^{90}$ (in 90 kHz), $0.06944\ldots \times s^{27}$ (in 27 MHz) (s: time interval), but $20.833\ldots$, and $0.06944\ldots$ are both indefinite decimal. Therefore, the calculation result involves an accumulative error even if floating-point calculation is carried out.

Incidentally, Japanese Unexamined Patent Application Publication No. 9-284732 (Miyazawa et al.) describes a technique of correcting an accumulative error involved in integer arithmetic unlike buffer simulation. The MPEG1 Layer 2 audio defines a sampling frequency of 44.1 kHz, so increments ($\Delta$PTS) of decoding time for each frame in units of 90 kHz cannot take an integer value as follows.

$$\Delta PTS = 1152 \times 90 \text{ (kHz)} / 44.1 \text{ (kHz)} = 2351.0204$$

If calculation is performed with the value of $\Delta$PTS approximated to 2351 or 2352 to realize integer arithmetic, video data and audio data are out of sync upon compressing/decompressing the data due to an accumulative error. To avoid the accumulative error, the audio/video data generating device of Miyazawa et al. approximates $\Delta$PTS to 2351 and corrects an audio PTS value per second.

As described above, the MP@ML specifications define the leak rate Rbx as 15,000,000 bps. If a rate of TS, that is, a rate of the entire stream is 15,000,000 bps or less, the leak rate Rbx does not exceed 15,000,000 bps. Hence, a conventional multiplexer of Takasaka et al. has only to execute simulation of the elementary buffer 313 for video data without a need to execute simulation of the main buffer 312.

However, in order to deal with a large-capacity medium in future, it is necessary to keep up with 18,000,000 bps that is the maximum TS rate of the MP@ML specifications. At this time, there is a possibility that the leak rate Rbx exceeds 15,000,000 bps, so it is necessary to perform buffer simulation of the main buffer 312. However, in the buffer simulation of the main buffer 312, a value of the leak amount from the main buffer 312 is indefinite decimal, resulting in a problem that an accumulative error is involved even with the floating-point calculation.

In addition, the technique of Miyazawa et al. realizes integer arithmetic of audio PTS by correcting an error of the audio PTS calculated from the integer arithmetic per second. However, it is preferred to perform calculation in an encoding processing on the basis of system clock in consideration of the other processing. The buffer simulation causes an other problem in that an error is too large for an appropriate simulation if correction is executed at as long time interval as 1 second.

SUMMARY OF THE INVENTION

A multiplexer according to an aspect of the present invention includes: a simulation unit performing simulation of a buffer occupation necessary for a multiplexed stream obtained by multiplexing a first encode stream and a second encode stream upon decoding the multiplexed stream, and calculating a leak data amount with integer arithmetic based on a buffer leak rate to calculate the buffer occupation; and a multiplexer control unit controlling multiplexing of the first encode stream based on the simulation result not to cause overflow of the buffer.

According to the present invention, simulation of the buffer occupation necessary for the multiplexed stream is performed, and multiplexing is controlled not to cause overflow of the buffer. At this time, the buffer occupation is calculated by integer arithmetic based on a leak rate, so calculation in the buffer simulation is simplified.

That is, according to the present invention, it is possible to provide a multiplexer and a multiplexing method which can offer a multiplexed stream without causing overflow of a stream buffer upon decoding with simple calculation.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Hereinafter, an embodiment of the present invention is described in detail with reference to the accompanying drawings. A multiplexer according to the embodiment of the present invention suppresses an error of a leak amount in a main buffer MB into a predetermined error range with a given time interval $\Delta t$ during T-STD buffer simulation. Further, the leak amount can be calculated with integer arithmetic. In particular, in this embodiment, to keep up with a TS rate of 15,000,000 bps or more, buffer simulation for a main buffer MB of a T-STD is executed. The buffer simulation for the main buffer MB is carried out at predetermined time intervals (for example, transport1 packet output period), and a result of simulation calculation of a leak amount from a main buffer MB to an elementary buffer EB, which is carried out at a predetermined time interval Δt is corrected upon each calculation to thereby prevent an accumulative error. It is possible to provide the multiplexer that can keep up with the maximum TS rate of 18,000,000 bps within the MP@ML specifications.

Figure 4:
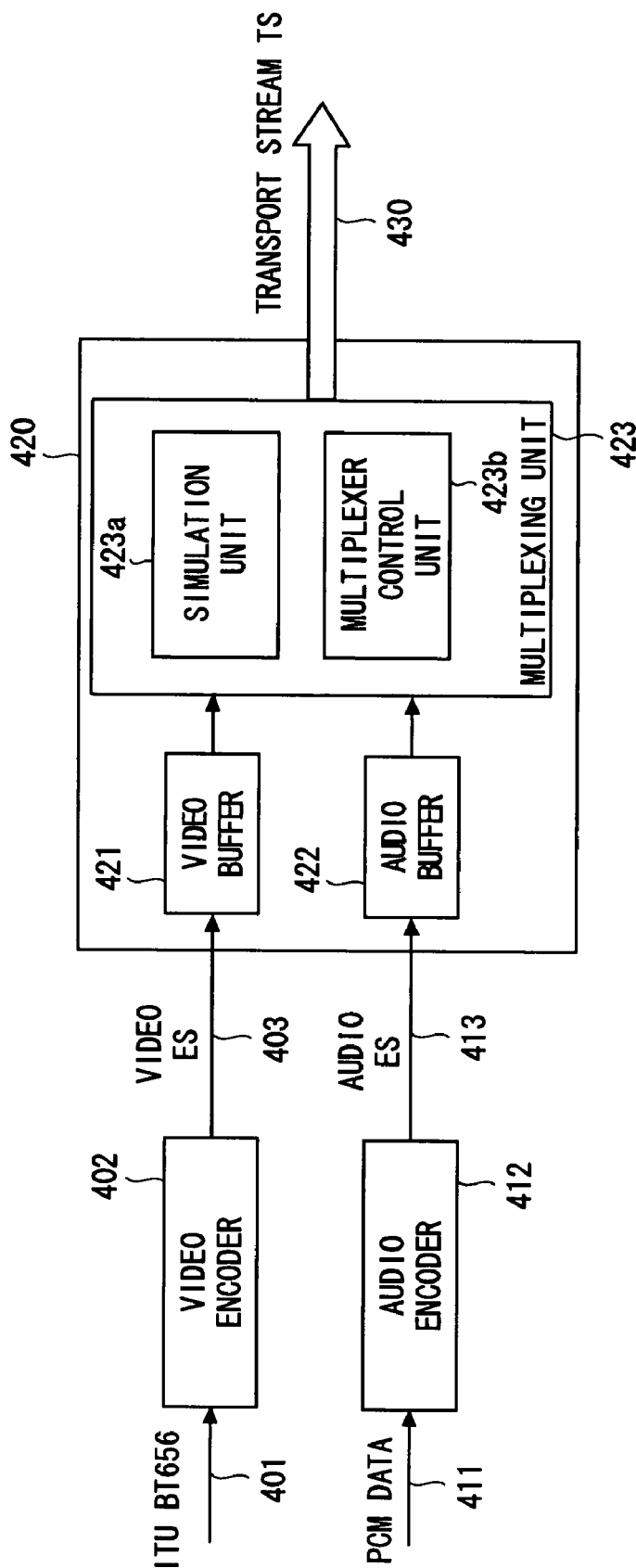
FIG. 4 shows a video/audio encoder and a TS multiplexer according to an embodiment of the present invention.

FIG. 4 shows a video/audio encoder and a TS multiplexer (Multiplexer). Reference numeral 402 denotes a video encoder; 412, an audio encoder; and 420, the entire multiplexer. The multiplexer 420 includes a video buffer 421, an audio buffer 422, and a multiplexing unit 423. For example, non-compressed video data 401 conforming to the ITU (International Telecommunication Union) BT656 standards or the like is input to the video encoder 402. The video encoder 402 compresses the video data 401 to generate a video elementary stream (video ES) 403 and supply the stream to the video buffer 421 in the multiplexer 420. As for audio data as well, non-compressed PCM (Pulse Code Modulation) data 411 is input to the audio encoder 412. The audio encoder 412 compresses the PCM data 411 to generate the audio elementary stream (audio ES) 413 and supply the stream to the audio buffer 422 in the multiplexer 420.

Figure 1:
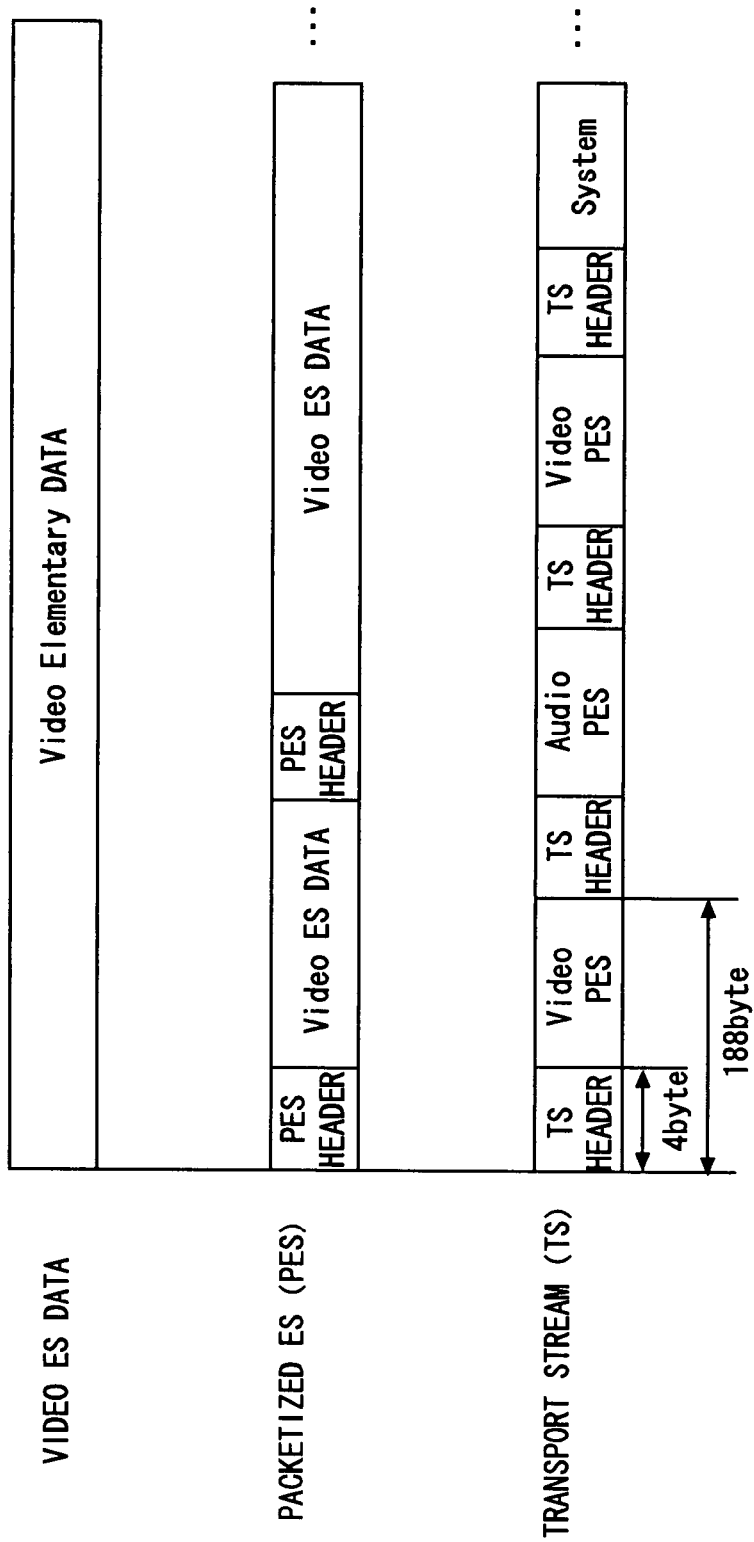
FIG. 1 shows the structure of an elementary stream ES, a packetized ES (PES), and a transport stream TS.
Figure 2:
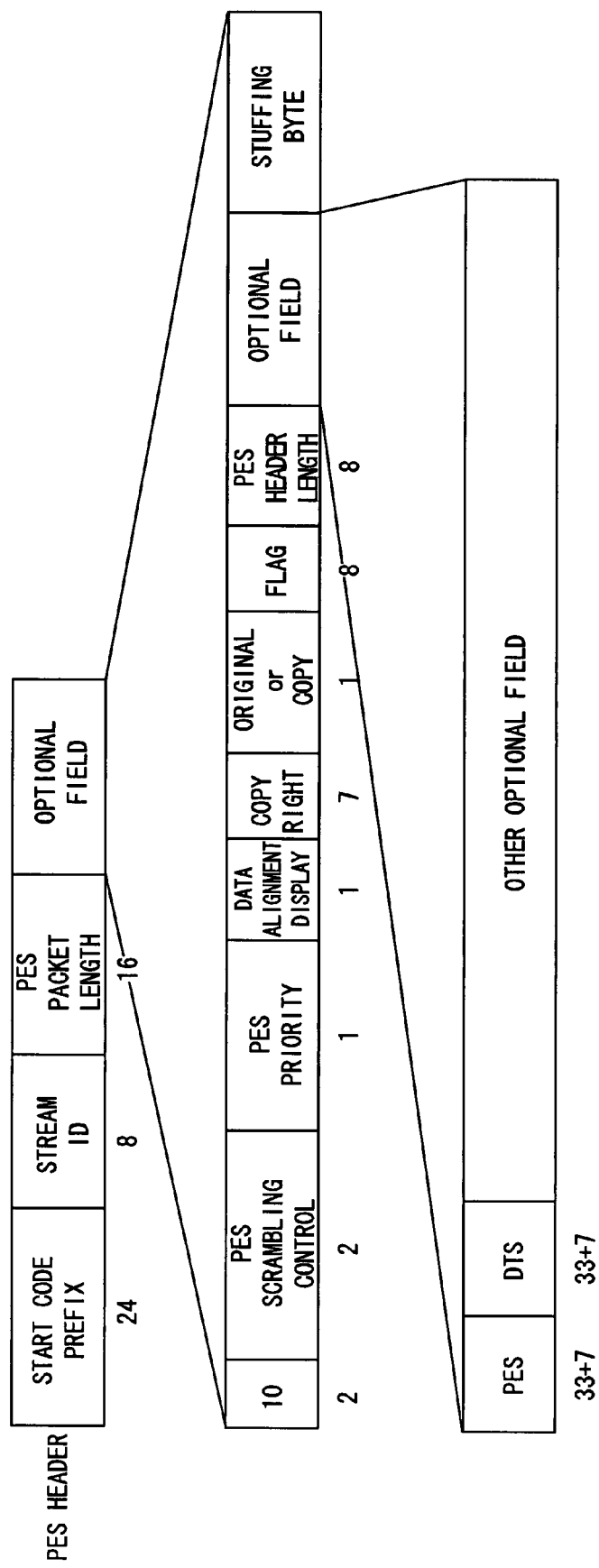
FIG. 2 shows the data structure of a PES packet header.
Figure 3:
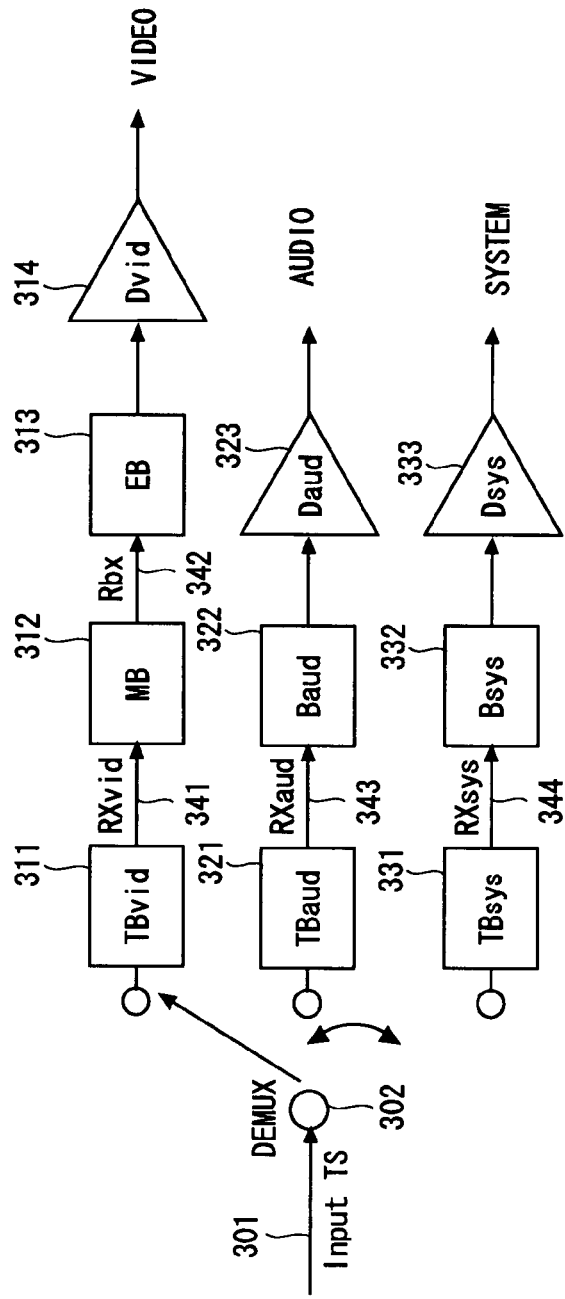
FIG. 3 is a block diagram of a virtual decoder (transport stream system target decoder) under the MPEG transmission standards.

The multiplexing unit 423 first packetizes video ES and audio ES (converts the ESs into PES). Then, appropriate decoding time DTS and Presentation time PTS are added to a PES header. After that, multiplexing is executed based on a T-STD buffer simulation with the T-STD as shown in FIG. 3 to generate and output a transport stream 430.

That is, the multiplexing unit 423 includes a simulation unit 423a for executing T-STD simulation and a multiplexer control unit 423b that controls multiplexing of a video ES based on the simulation result not to cause an overflow of the main buffer. The simulation unit 423a calculates the proportion of the main buffer MB every time interval Δt. That is, the value Δt is divided by N ((main buffer MB leak rate Rbx/basic clock frequency)×N=integer), and a current leak data amount is calculated by integer arithmetic based on the quotient (quotient is an integer), and the remainder (Δtmod N) is added to next time interval Δt to thereby correct the leak data amount. Here, in this embodiment, a basic clock frequency is 90 kHz that is similar to the time information or 27 MHz that is a MPEG2 system clock frequency.

In this embodiment, even in the case of transferring a TS at the TS rate 15,000,000 bps or more, for example, the maximum MP@ML TS rate of 18,000,000 bps, a multiplexing factor for the audio TS packet is changed or null packet is inserted to the transport stream to thereby avoid overflow of the main buffer MB (312) under the control. Incidentally, in the T-STD buffer simulation, a CPU (Central Processing Unit) of the multiplexing unit 423 executes a computer program, and a virtual decoder of FIG. 3 performs decoding. In this embodiment, the T-STD is a software component, but the present invention is not limited thereto and the decoder of FIG. 3 may be a hardware component, which can be used for buffer simulation.

Next, detailed description is made of a TS packet transmitting method with the multiplexing unit 423. For ease of illustration, the following description is focused on a video ES. The multiplexing unit 423 performs T-STD buffer simulation at regular intervals, for example, every packet. Then, it is determine whether or not to transmit a video packet under the MPEG transmission standard. If necessary, the video packet is multiplexed with an audio packet or null packet to control the transfer rate not to cause overflow of a video buffer on the decoder side.

Figure 5:
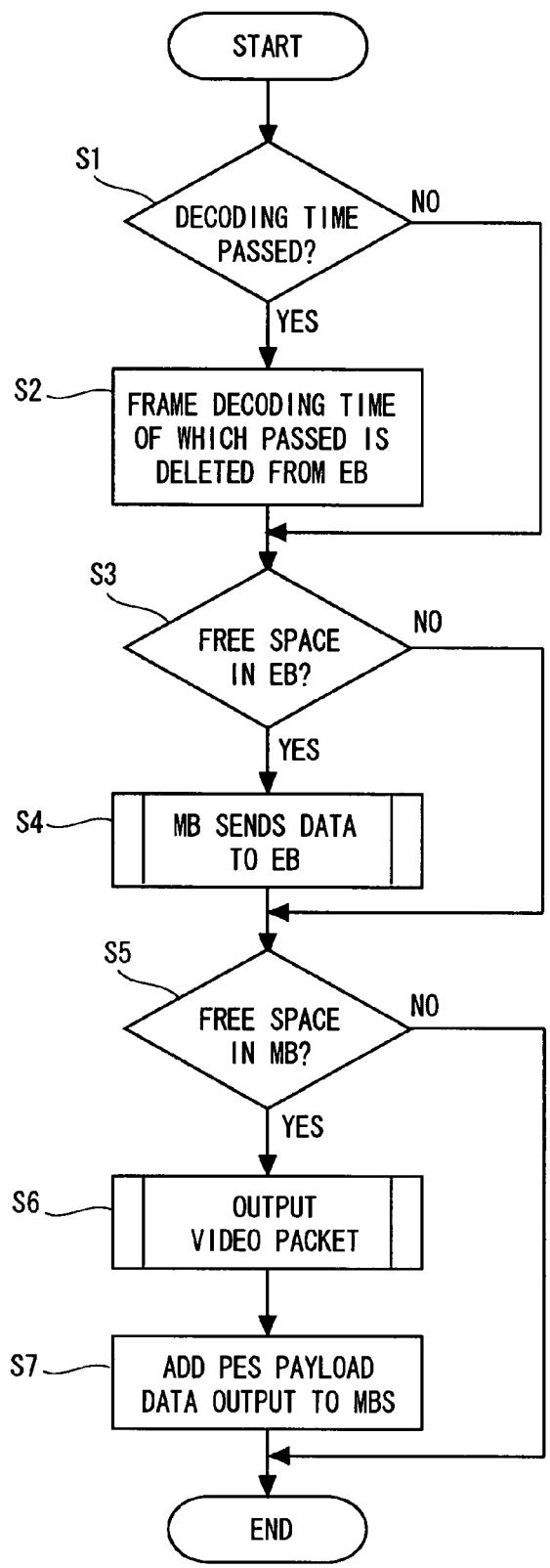
FIG. 5 is a flowchart of a T-STD buffer simulation method for video data in MP@ML specifications with the multiplexer of this embodiment.

FIG. 5 is a flowchart of a method of T-STD buffer simulation for video data in accordance with the MP@ML specifications. First, it is checked whether or not decoding time DTS for a given frame passed. If the decoding time DTS passed (step S1: YES), the process advances to step S2. If not passed, the process skips step S2 and advances to step S3. In step S2, data on a frame the decoding time DTS for which passed is deleted from the elementary buffer 313.

In step S3, it is checked whether or not there is a free space in the elementary buffer 313. If there is a free space, the process advances to step S4; otherwise, the process skips step S4 and advances to step S5. In step S4, data is transferred from the main buffer 312 to the elementary buffer 313.

In step S5, it is checked whether or not there is a free space in the main buffer MB. If there is a free space, the process advances to step S6. If there is no space, the process skips steps S6 and S7 and is ended. In step S6, a video packet is output to the main buffer 312. Then, in step S7, an output PES payload data amount is added to the buffer occupation MBS of the main buffer 312.

Next, description is given of a calculating method of the buffer occupation MBS of the main buffer 312 in step S4 of FIG. 5 upon the calculation based on the 90 kHz counter, that is, upon transferring data from the main buffer 312 to the elementary buffer 313. The leak rate Rbx 15,000,000 (bit/s) can be expressed in units of 90 kHz as follows.

$$15{,}000{,}000 \text{ (bit/s)} = 1{,}875{,}000 \text{ (Byte/s)}$$

Assuming that a clock frequency is 90 kHz, a leak rate Rbx per clock is calculated as follows.

$$1{,}875{,}000/90{,}000 \text{ (Byte: 90 kHz)} = (2^3 \times 3 \times 5^7)/(2^4 \times 3^2 \times 5^4) \text{ (Byte: 90 kHz)} = 5^3/(2 \times 3) \text{ (Byte: 90 kHz)}$$

In the above expressions, $5^3/(2 \times 3) = 125/6$ indicates a leak data amount per count value in units of 90 kHz. In other words, it is apparent that an amount of data that leaks from the main buffer 312 is an integer (=125) every 6 count values (2×3=6) in units of 90 kHz. This can be expressed by the general formula as follows. Provided that X represents increments in counter in units of 90 kHz, $$\text{leak data amount}: X \times 5^3/(2 \times 3) = X \times (125/6) = [X/6] \times 125 + (X \bmod 6) \times (125/6)$$

where if $k \leq K < k+1$, $[K] = k$ (k is natural number). That is, $[X/6]$ corresponds to an integer portion of the quotient obtained by dividing X by 6. Xmod6 corresponds to the remainder obtained by dividing X by 6.

Therefore, if X is divisible by 6, Xmod6=0, and the following expression is satisfied.

$$X \times (125/6) = [X/6] \times 125$$

In this embodiment, if the count value in a predetermined period is indivisible by 6, the remainder (Xmod6) is carried over to the next calculation. That is, $[X/6] \times 125$ is set such that a data amount $X \times 5^3/(2 \times 3)$ of data that leaks from the main buffer 312 up to the count value X is calculated by the integer arithmetic. Hence, a leak data amount R×(125/6) based on the indivisible remainder R=Xmod6 (hereinafter referred to as a correction value) is an error. However, in this embodiment, the remainder R=Xmod6 is added to the next calculation of a leak data amount to thereby correct the error.

For example, it is assumed that a leak data amount is calculated with each 90 kHz counter. A leak data amount measured up to a given count value can be calculated by the integer arithmetic ([X/6]×125=0) based on the quotient (quotient is an integer) (=[X/6]=0) obtained by dividing "X=1" by "6". Then, the current remainder Xmod6=1 is added to increments(X) in counter next time. Then, increments X in counter is 6 at the sixth count value and is divisible by X/6, so Xmod6=0, and an error of the leak data amount is eliminated. In this way, an error can be suppressed into a predetermined range. Incidentally, as described above, a leak data amount is calculated every count value, for example, every packet, and the maximum value of Xmod6 is 5. The maximum value of an error of a leak data amount based on the remainder R, which is carried over to the next calculation is (125/6)×5.

Here, assuming that Δt(n)=t(n)−t(n−1), time difference after correction X(n)=Δt(n)+R(n−1) where t(0)=0, R(0)=0, n>1.

The buffer occupation of the main buffer is derived from the following expression.

$$MBS(n)=MBS(n-1)-[X(n)/6]\times 125=MBS(n-1)-[(\Delta t(n)+(R(n-1))/6)]\times 125$$

where a correction value R(n)=X(n) mod6
t(n−1): previous calculation time (90 kHz)
t(n): current calculation time (90 kHz)
MBS(n−1): previous buffer occupation of the main buffer MB
MBS(n): current buffer occupation of the main buffer MB As described above, in step S4, the buffer occupation of the main buffer 312 at the time of transferring data from the main buffer 312 to the elementary buffer 313 can be calculated by the integer arithmetic within a predetermined error range. As a result, if there is no free space in the main buffer 312, no video packet is output, and an audio packet, system packet, or null packet is output, for example. Hence, overflow of the main buffer 312 can be prevented at the TS rate of 18,000,000 bps.

Figure 6:
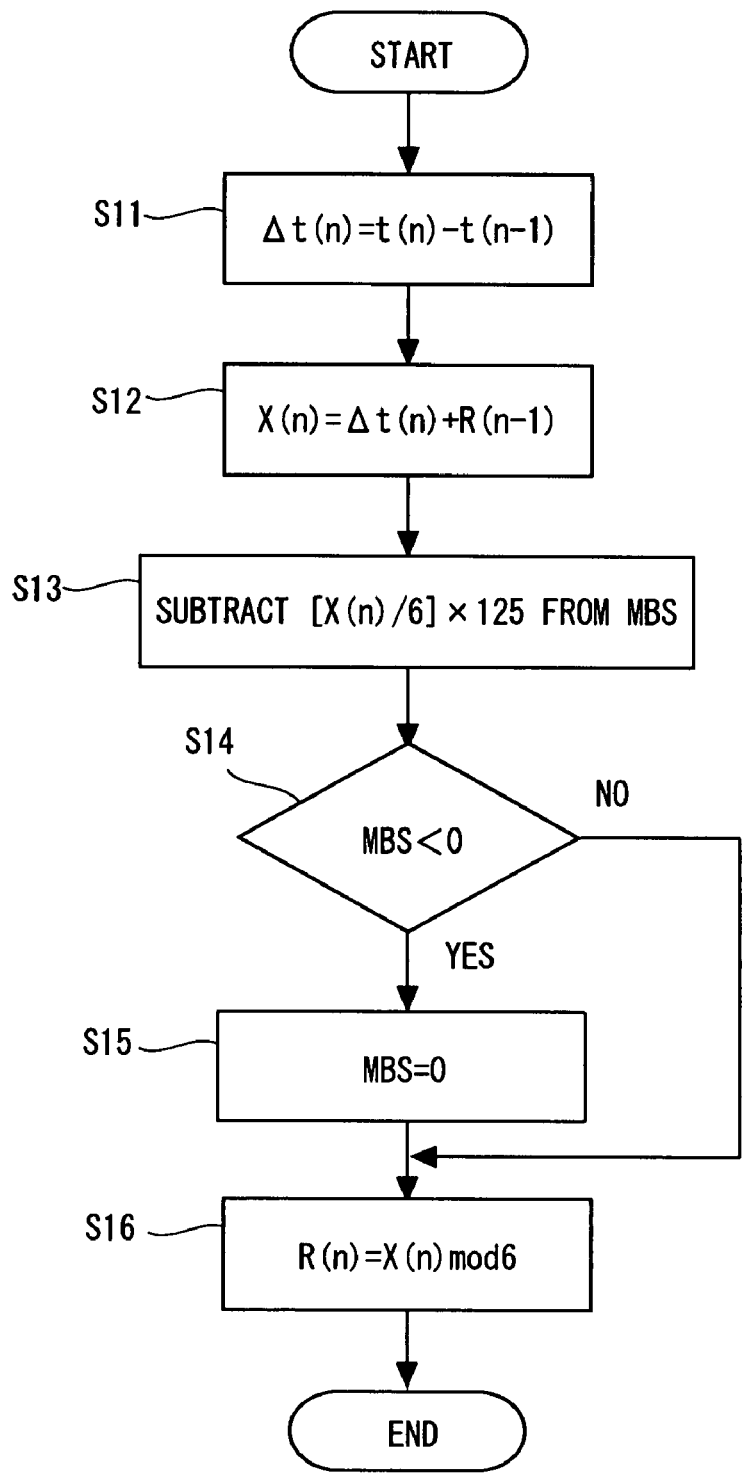
FIG. 6 is a flowchart of a detailed processing in step S4 of FIG. 5 upon calculation on the basis of 90 kHz counter.

FIG. 6 is a flowchart of a detailed processing of step S4 upon the calculation based on the 90 kHz counter. In step S4 of FIG. 5, first, a difference Δt (n) between the previous calculation time t(n−1) and current calculation time t(n) is calculated in units of 90 kHz (step S11). Next, the calculated difference Δt (n) is added with the obtained correction value R(n−1), and a difference X(n) between the previous calculation time and current calculation time is calculated (step S12).

Then, a data amount ([X(n)/6]×125) of data that leaks from the main buffer 312 during the difference X (n) is subtracted from the previous buffer occupation MBS (n−1) (step S13). Here, as defined by the standards, a PES header is instantly removed upon transferring data from the main buffer 312 to the elementary buffer 313, so the PES header is not included in the leak data amount.

Next, it is checked, based on the calculation result in step S13, whether or not the buffer occupation MBS (n) of the main buffer 312 is smaller than 0 (step S14). If the buffer occupation MBS (n) of the main buffer 312 is smaller than 0, the buffer occupation MBS(n) is set to 0 (step S15) and the process advances to step S16. On the other hand, if the buffer occupation MBS(n) of the main buffer 312 is larger than 0, the buffer occupation MBS(n) is not changed, and the process advances to step S16. In step S16, the correction value R(n) in the next calculation=X(n) mod6 is calculated. In this way, in step S4 of FIG. 5, a leak data amount of data that leaks from the main buffer 312 to the elementary buffer 313 is calculated to determine the buffer occupation of the main buffer 312.

Figure 7:
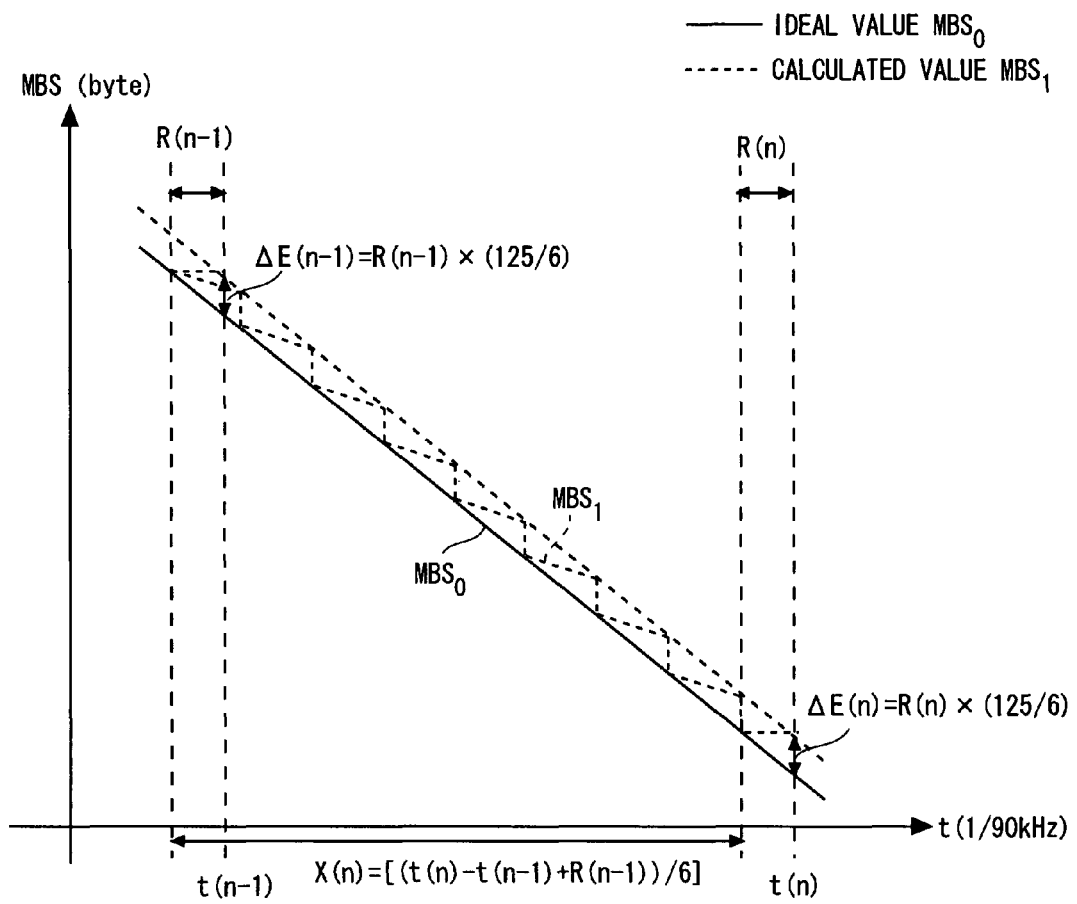
FIG. 7 is a graph of how the buffer occupation MBS changes in the case where no data is input to the main buffer 312 with the 90 kHz counter.

FIG. 7 is a graph of how the buffer occupation is changed in the case where no data is input to the main buffer 312 with the 90 kHz counter. In FIG. 7, the solid line indicates an ideal buffer occupation $MBS_0$, and the broken line indicates a buffer occupation $MBS_1$ that is obtained through the above calculation.

Error ΔE(n)=R(n)×(125/6)

where R(n)=Xmod6, so R(n) is 0 to 5. As apparent from the above, the error ΔE(n) falls within a value of 0≦ΔE(n)<125 all the time. That is, Xmod6=0 every 6 count values, and the error ΔE(n) corresponds to the ideal value $MBS_0$.

In this embodiment, buffer simulation of the main buffer 312, which is unnecessary in the T-STD buffer simulation of the related art, is carried out to keep up with a high-speed transfer rate. Then, a video ES is multiplexed under the control not to cause overflow of a video data buffer on the decoder side. Thus, even if a transfer speed for a transport stream increases, upon decoding the transport stream on the decoder side, a multiplexed stream that can be decoded is obtained without causing overflow of the buffer.

Then, in the buffer simulation, even if a leak rate Rbx of data leak from the main buffer 312 to the elementary buffer 313 is 15,000,000 bps upon calculation based on the 90 kHz counter, a leak amount from the main buffer 312 at a given time interval is an integer. Hence, the buffer occupation MBS (n) of the main buffer 312 at given time t(n) can be calculated by the integer arithmetic. Further, the buffer occupation of the main buffer 312 can be calculated with no accumulative error ΔE (n) by use of the correction value R(n).

Incidentally, in the above embodiment, as a conceivable example of such N that (main buffer leak rate/clock frequency) (90 kHz)×N=integer, N is set to 6 for calculation. However, similar calculation can be performed as long as N is a multiple of 6 (6×i (i is natural number)). Here, since the error ΔE(n)=R(n)×(125/6)×i, 6 is preferable in that the error is minimized. Further, as t(n−1) and t(n), for example, PCR (Program Clock Reference) time in the transport stream may be used. A PCR is reference time information of 27 MHz in the transport stream.

Next, a method of calculating a correction value in units of 27 MHz is described below. 15,000,000 (bit/s) can be expressed in units of 27 MHz as follows.

15,000,000 (bit/s)=1,875,000 (Byte/s)

A leak rate Rbx per clock is calculated with the clock frequency set to 27 MHz as follows.

1,875,000/27,000,000 (Byte: 27 MHz)=($2^3 \times 3 \times 5^7$)/($2^6 \times 3^3 \times 5^6$) (byte: 27 MHz)=5/($2^3 \times 3^2$) (Byte: 27 MHz)

That is, as apparent from the above, an amount of data that leaks up to a count value of $2^3 \times 3^2$=72 in units of 27 MHz is an integer. This can be expressed by the general formula as follows. If X represents increments in counter in units of 27 MHz, leak data amount:

X×5/($2^3 \times 3^2$)=X×(5/72)=[X/72]×5+(Xmod72)×(5/72)

If X is divisible by 72, the following expression is satisfied.

X×5/($2^3 \times 3^2$)=X×(5/72)=[X/72]×5

That is, if X is indivisible by 72, data amount up to the count value of [X/72] is only calculated as a leak data amount, and an indivisible portion, that is, the remainder (correction value) R=Xmod72 is carried over to the next calculation of a leak data amount. Thus, each calculation is based on integer arithmetic.

Figure 8:
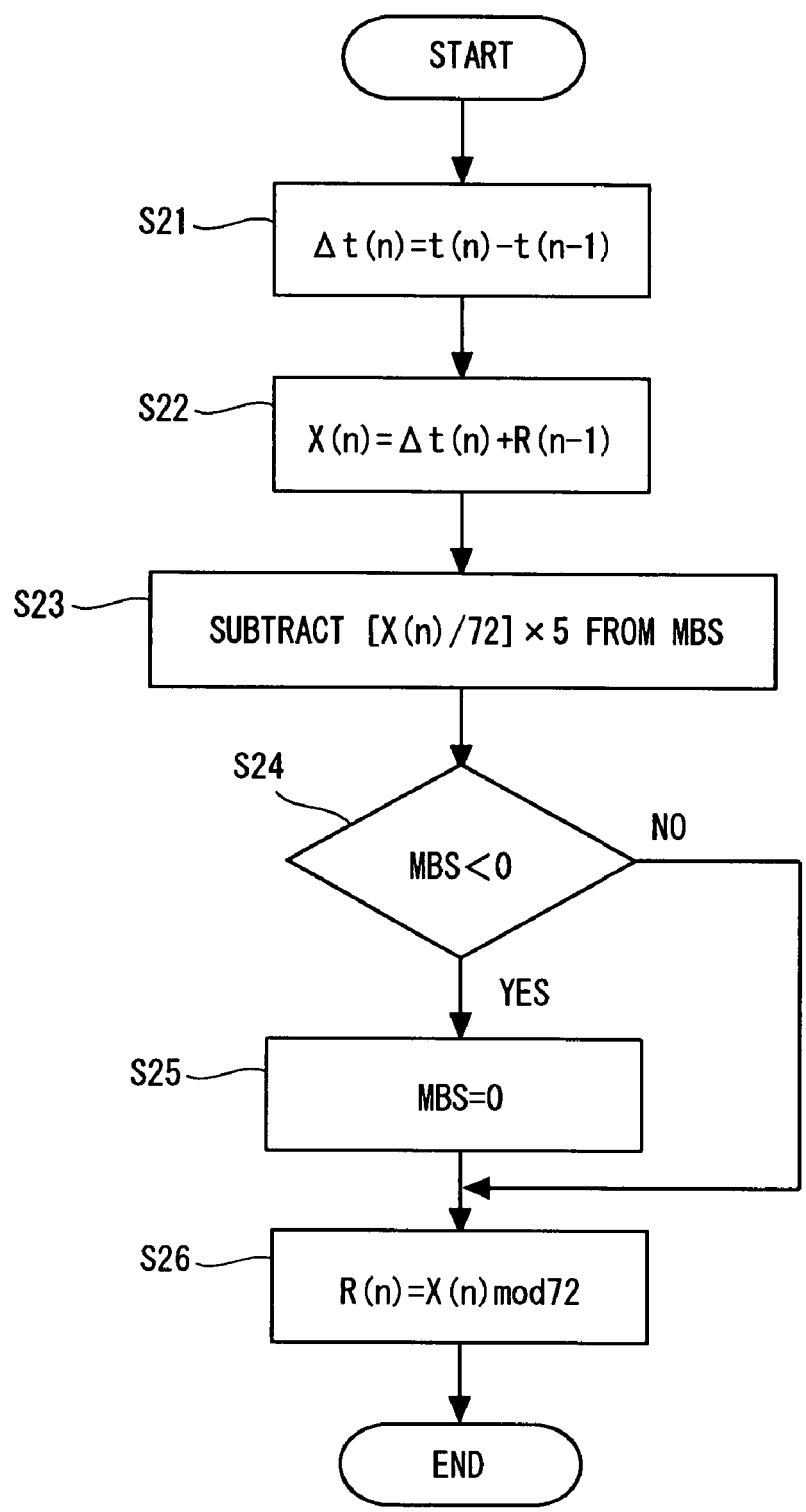
FIG. 8 is a flowchart of a detailed processing in step S4 of FIG. 5 if calculation is performed on the basis of 27 MHz counter.

Hence, if $\Delta t(n)=t(n)-t(n-1)$, $X(n)=\Delta t(n)+R(n-1)$ $t(0)=0, R(0)=0, n \geq 1$ buffer occupation=MBS$-[X(n)/72]\times 5$ MBS$-[(\Delta t(n)+(R(n-1))/72]\times 5$ where R(n)=X(n) mod72
t(n−1): previous calculation time (27 MHz)
t(n): current calculation time (27 MHz)
MBS: MB buffer occupation
X(n): time difference after correction FIG. 8 is a flowchart of a detailed processing of step S4 in FIG. 5 upon calculation based on the 27 MHz counter. First, a difference Δt (n) between previous calculation time t(n−1) and current calculation time t(n) is calculated (27 MHz) (step S21). Next, the difference Δt (n) calculated in step S21 is added with a correction value R(n−1) for the previous calculation, and the calculation time difference X (n) is calculated in consideration of the correction value (step S22). Then, a data amount ([X(n)/72]×5) of data that leaks from the main buffer 312 is subtracted from the buffer occupation MBS of the main buffer 312. As described above, under the standards, a PES header is instantly removed upon transferring data from the main buffer 312 to the elementary buffer 313, so the PES header is not included in the leak data amount.

Next, it is checked based on the calculation result in step S23, whether or not the buffer occupation MBS of the main buffer 312 is smaller than 0 (step S24). If the buffer occupation MBS of the main buffer 312 is smaller than 0, the buffer occupation MBS is set to 0 (step S25), and the process advances to step S26. On the other hand, if the buffer occupation MBS of the main buffer 312 is larger than 0, the buffer occupation MBS is not changed and the process advances to step S26. In step S26, a correction value R(n) for subsequent calculation is calculated.

Figure 9:
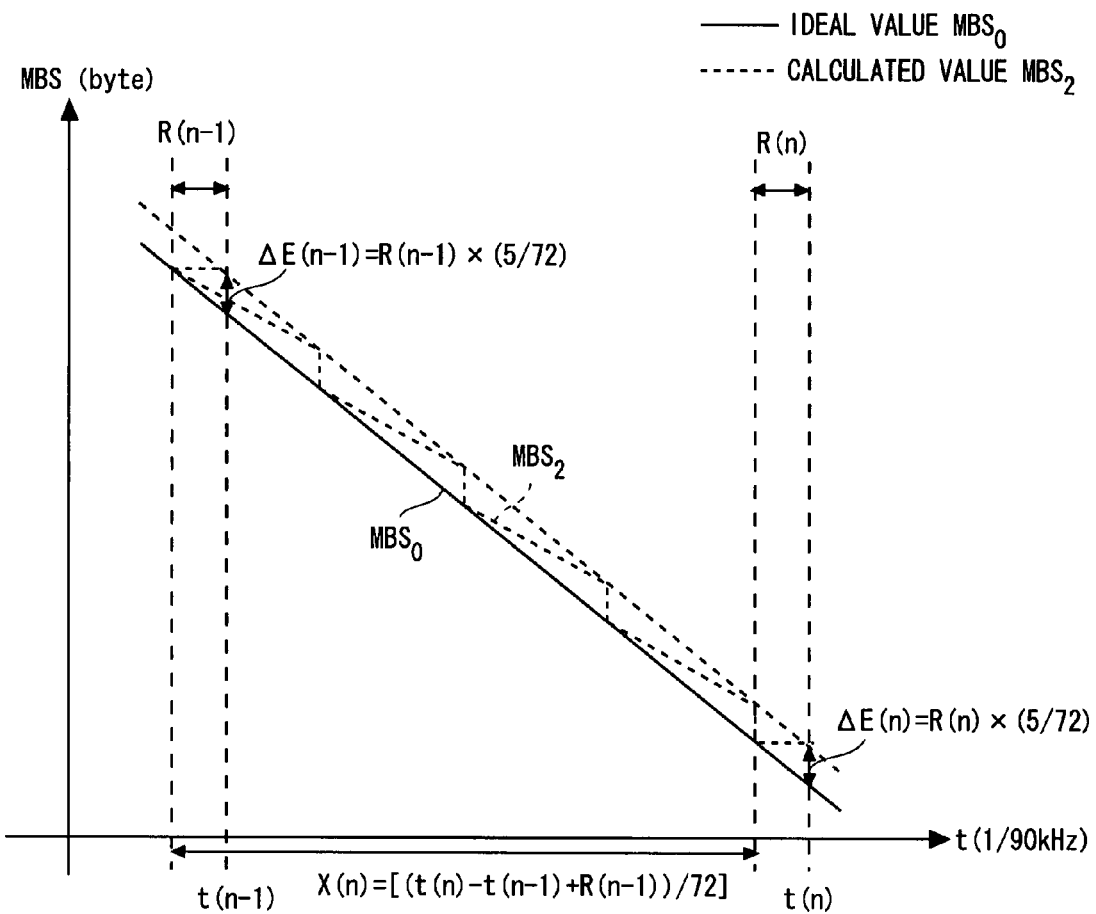
FIG. 9 is a graph of how the buffer occupation MBS changes in the case where no data is input to the main buffer 312 with the 27 kHz counter.

FIG. 9 is a graph of how the buffer occupation is changed in the case where no data is input to the main buffer 312 with the 27 MHz counter. The solid line indicates an ideal buffer occupation $MBS_0$, and the broken line indicates a buffer occupation $MBS_2$ that is derived through the above calculation.

Error $\Delta E(n)=R(n)\times(5/72)$ where R(n)=Xmod72, so R(n) is 0 to 71, and the error ΔE(n) falls within a range of $0 \leq \Delta E(n) < 5$ all the time. That is, R(n)=Xmod72=0 every 72 count values, and the error ΔE(n) corresponds to the ideal value $MBS_0$.

As described above, even if the 27 MHz counter is used, under the condition that a leak rate Rbx of data that leaks from the main buffer 312 to the elementary buffer 313 is 15,000,000 bps, a leak data amount from the main buffer 312 at a given time interval is an integer. Hence, the buffer occupation MBS of the main buffer 312 at given time t(n) is an integer. Further, the correction value R(n) is used to suppress the error ΔE(n) into a predetermined range to thereby enable calculation with no accumulative error. Further, the MPEG2 system clock frequency is defined as 27 MHz, so calculation can be carried out with high accuracy.

Incidentally, in the above example, the time interval is aligned to 72 count values for calculation, but similar calculation can be carried out as long as the multiple of 72 (72×i (i ∈ natural number)) is used. Here, an error $\Delta E(n)=R(n)\times(5/72)\times i$, so 72 is preferable in that the error is minimized.

As described above, in this embodiment, in the case where a leak data amount of the main buffer is calculated based on the system clock frequency or the integral multiples thereof, such N that (leak rate/system clock frequency)×N is an integer is determined to align increments in clock with N to thereby set the leak data amount to an integer. In addition, omitted fractions of increments in clock frequency in the alignment are added to the next increments in clock frequency for calculation. Hence, even with the leak rate indivisible by 90 kHz or 27 MHz, a calculation error can be suppressed into a predetermined range, and calculation can be performed with no accumulative error. In addition, calculation can be performed based on the integer arithmetic, not floating-point calculation, so a processing load can be reduced.

It is apparent that the present invention is not limited to the above embodiment that may be modified and changed without departing from the scope and spirit of the invention.

What is claimed is:

1. A multiplexer, comprising: a simulation unit calculating a buffer occupation which is necessary to decode a multiplexed stream including a first encode stream and a second encode stream by calculating a leak data amount with integer arithmetic based on a buffer leak rate; and a multiplexer control unit controlling multiplexing of the first encode stream based on the simulation result so as not to cause overflow of the buffer~ wherein the simulation unit calculates the buffer occupation at a time interval Δt, the interval Δt is divided by N which takes an integer if multiplied by (leak rate/basic clock frequency) of the buffer, a current leak data amount is calculated at each time interval Δt by integer arithmetic based on the quotient (quotient is an integer) by computing an integer portion of (a current clock count value divided by N), and the remainder as a modulo N of (the current clock value divided by N) is added to the next time interval Δt to perform a correction of the leak data amount based on N.

2. The multiplexer according to claim 1, wherein the basic clock is a system clock or a clock having an integral multiple of a frequency of the system clock.

3. The multiplexer according to claim 1, wherein the buffer comprising a first buffer and second buffer sequentially store the multiplexed stream, and the leak rate is a rate of leak from the first buffer to the second buffer.

4. The multiplexer according to claim 1, wherein the buffer comprising a first buffer and second buffer sequentially store the multiplexed stream, and the leak rate is a rate of leak from the first buffer to the second buffer.

5. The multiplexer according to claim 2, wherein the buffer comprising a first buffer and second buffer sequentially store the multiplexed stream, and the leak rate is a rate of leak from the first buffer to the second buffer.

6. The multiplexer according to claim 4, wherein a leak data amount of the main buffer is calculated to calculate the proportion of the first buffer.

7. The multiplexer according to claim 1, wherein the basic clock frequency is 90 kHz, and N is a multiple of 6.

8. The multiplexer according to claim 2, wherein the basic clock frequency is 90 kHz, and N is a multiple of 6.

9. The multiplexer according to claim 1, wherein the basic clock frequency is 27 MHz, and N is a multiple of 72.

10. A multiplexing method for multiplexing a first encode stream and a second encode stream to generate a multiplexed stream, comprising:

performing simulation of a buffer occupation necessary for the multiplexed stream upon decoding the multiplexed stream by calculating a leak data amount with integer arithmetic based on a buffer leak rate; and controlling multiplexing of the first encode stream based on the simulation result so as not to cause overflow of the buffer, wherein the step of performing simulation comprises:

calculating the buffer occupation at a time interval $\Delta t$, the interval $\Delta t$ is divided by N which takes an integer if multiplied by (leak rate/basic clock frequency) of the buffer; and calculating a current leak data amount at each time interval $\Delta t$ by integer arithmetic based on the quotient (quotient is an integer) by computing an integer portion of (a current clock count value divided by N); and adding the remainder as a modulo N of (the current clock value divided by N) to the next time interval $\Delta t$ to perform a correction of the leak data amount based on N.

11. The multiplexer according to claim 3, wherein the first encode stream is a video stream and the second encode stream is an audio stream, and wherein, when it is determined based on the buffer leak rate that the first buffer is full, an audio packet, system packet or null packet is output and no video packet is output.

12. The multiplexer according to claim 4, wherein the first encode stream is a video stream and the second encode stream is an audio stream, and wherein, when it is determined based on the buffer leak rate that the first buffer is full, an audio packet, system packet or null packet is output and no video packet is output.

13. The multiplexer according to claim 5, wherein the first encode stream is a video stream and the second encode stream is an audio stream, and wherein, when it is determined based on the buffer leak rate that the first buffer is full, an audio packet, system packet or null packet is output and no video packet is output.

* * * * *